US010268032B2

(12) United States Patent
Castrillon (10) Patent No.: US 10,268,032 B2
(45) Date of Patent: Apr. 23, 2019

(54) SYSTEMS AND METHOD FOR IMAGING DEVICES WITH ANGULAR ORIENTATION INDICATIONS (71) Applicant: The Board of Regents of the University of Texas System, Austin, TX (US)

(72) Inventor: Diego H Castrillon, Dallas, TX (US)

(73) Assignee: The Board of Regents of the University of Texas System, Austin, TX (US)

(*) Notice: Subject to any disclaimer, the term of this patent is extended or adjusted under 35 U.S.C. 154(b) by 58 days.

(21) Appl. No.: 15/643,738

(22) Filed: Jul. 7, 2017

(65) Prior Publication Data
US 2018/0011305 A1  Jan. 11, 2018

Related U.S. Application Data (60) Provisional application No. 62/359,359, filed on Jul. 7, 2016.

(51) Int. Cl.
G02B 21/36 (2006.01)
H04N 7/18 (2006.01)
G02B 25/00 (2006.01)

(52) U.S. Cl.
CPC ......... *G02B 21/364* (2013.01); *G02B 21/361* (2013.01); *G02B 21/365* (2013.01); *G02B 21/368* (2013.01); *G02B 25/001* (2013.01); *H04N 7/18* (2013.01)

(58) Field of Classification Search
None
See application file for complete search history.

(56) References Cited

U.S. PATENT DOCUMENTS

| 4,672,559 | A | | 6/1987 | Jansson et al. |
| 5,376,007 | A | * | 12/1994 | Zirm ........................ G09B 5/06 348/588 |
| 5,586,243 | A | | 12/1996 | Barber et al. |
| 6,549,222 | B1 | | 4/2003 | Skoll |
| 6,965,356 | B2 | * | 11/2005 | Vaccarelli ............ G02B 21/367 345/2.2 |
| 8,638,308 | B2 | * | 1/2014 | Cunningham .......... G06F 3/016 345/156 |
| 2001/0050999 | A1 | | 12/2001 | Bacus |
| 2002/0149628 | A1 | | 10/2002 | Smith |
| 2004/0227954 | A1 | | 11/2004 | Xie |
| 2006/0122516 | A1 | | 6/2006 | Schmidt et al. |
| 2007/0239005 | A1 | | 10/2007 | Ogasawara |
| 2011/0164314 | A1 | | 7/2011 | Shirota et al. |
| 2012/0068928 | A1 | | 3/2012 | Bruss et al. |

* cited by examiner

*Primary Examiner* — Derek S Chapel
(74) *Attorney, Agent, or Firm* — Parker Highlander PLLC (57) ABSTRACT

Exemplary embodiments of the present invention relate generally to the fields for indicating a location on an image in a multi-viewer display. In particular embodiments, the multi-viewer display may be a multi-viewer microscope.

20 Claims, 5 Drawing Sheets

SYSTEMS AND METHOD FOR IMAGING DEVICES WITH ANGULAR ORIENTATION INDICATIONS

CROSS-REFERENCE TO RELATED APPLICATION

This application claims priority to U.S. Provisional Patent Application Ser. No. 62/359,359 filed Jul. 7, 2016, the entire contents of which are incorporated by reference herein.

BACKGROUND

Exemplary embodiments of the present invention relate generally to the fields for indicating a location on an image in a multi-viewer display. In particular embodiments, the multi-viewer display may be a multi-viewer microscope. In other embodiments, the display is visualized by multiple viewers simultaneously through a computer or other type of network.

In certain embodiments, the display may be used in a collaboration among radiologists looking at images on different displays. In other embodiments, the display may be used among astronomers looking through telescope images on computer screens. In still other embodiments, the display may be used in collaborations among video game players across a network or collaborations among graphic artists across a network. In general, exemplary embodiments of the present invention may be used in any collaboration involving a mouse or other kind of pointer across a network.

SUMMARY

Exemplary embodiments of the present disclosure include systems and methods for indicating a location on an image in a multi-viewer display.

Certain embodiments include a system for indicating a location on an image in a multi-viewer display, where the system comprises a plurality of viewing locations configured to view the image, where: the image comprises a user-controlled indicator; the user-controlled indicator includes a directional element indicating a primary direction of the user-controlled indicator; and the user-controlled indicator includes a plurality of reference elements, wherein each of the reference elements indicates an angular orientation with respect to the directional element of the user-controlled indicator.

In particular embodiments, the multi-viewer display is a multi-viewer microscope, telescope or video game display. In some embodiments, an X-Y position of the user-controlled indicator in the image is controlled by a user at a central control module. In specific embodiments, an angular orientation of the user-controlled indicator in the image is controlled by the user at the central control module. In certain embodiments, the multi-viewer microscope comprises a first viewing station oriented 180 degrees from a second viewing station, and in particular embodiments, the directional element is configured as an arrow.

In some embodiments, the plurality of reference elements comprises: a first reference element indicating an angular orientation of ninety degrees clockwise from the directional element; a second reference element indicating an angular orientation of one-hundred eighty degrees clockwise from the directional element; and a third reference element indicating an angular orientation of two-hundred seventy degrees clockwise from the directional element. In specific embodiments, the plurality of reference elements further comprises: a fourth reference element indicating an angular orientation of thirty degrees clockwise from the directional element; a fifth reference element indicating an angular orientation of sixty degrees clockwise from the directional element; a sixth reference element indicating an angular orientation of one-hundred twenty degrees clockwise from the directional element; a seventh reference element indicating an angular orientation of one-hundred fifty degrees clockwise from the directional element; an eighth reference element indicating an angular orientation of two-hundred ten degrees clockwise from the directional element; a ninth reference element indicating an angular orientation of two-hundred forty degrees clockwise from the directional element; a tenth reference element indicating an angular orientation of three-hundred degrees clockwise from the directional element; and an eleventh reference element indicating an angular orientation of three-hundred thirty degrees clockwise from the directional element.

In certain embodiments, the user-controlled indicator comprises numerals to indicate corresponding clock face positions with respect to the directional element. In particular embodiments, the plurality of reference elements are configured as straight lines and in some embodiments the plurality of reference elements are configured as tapered lines. In specific embodiments, the plurality of reference elements are configured as angular points, and in certain embodiments, the plurality of reference elements are configured as arrows.

In particular embodiments, the user-controlled indicator comprises a circle; the directional element is configured as an arrow extending from the circle; and the plurality of reference elements extend from the circle. In some embodiments, the plurality of reference elements are configured as lines extending in an outward direction from the circle. In specific embodiments, the plurality of reference elements are configured as lines extending in an inward direction from the circle.

Certain embodiments include a method of indicating a location on an image in a multi-viewer display comprising a plurality of viewing locations. In particular embodiments, the method comprises: positioning a user-controlled indicator in a first location of the image, wherein the user-controlled indicator includes a directional element indicating a primary direction of the user-controlled indicator; and the user-controlled indicator includes a plurality of reference elements, wherein each of the reference elements indicates an angular orientation with respect to the directional element of the user-controlled indicator.

Some embodiments further comprise indicating a second position of the image, where: the second position of the image is located at a first angular orientation from the first position; and the first angular orientation corresponds with a first reference element of the user-controlled indicator. In specific embodiments, the multi-viewer display is a multi-viewer microscope, telescope or video game display. In certain embodiments, an X-Y position of the user-controlled indicator in the image is controlled by a user at a central control module. In particular embodiments, an angular orientation of the user-controlled indicator in the image is controlled by the user at the central control module. In some embodiments, the multi-viewer microscope comprises a first viewing station oriented 180 degrees from a second viewing station. In particular embodiments, the directional element is configured as an arrow. In some embodiments, the plurality of reference elements comprises: a first reference element indicating an angular orientation of ninety degrees clockwise from the directional element; a second reference element indicating an angular orientation of one-hundred eighty degrees clockwise from the directional element; and a third reference element indicating an angular orientation of two-hundred seventy degrees clockwise from the directional element.

In specific embodiments, the plurality of reference elements further comprises: a fourth reference element indicating an angular orientation of thirty degrees clockwise from the directional element; a fifth reference element indicating an angular orientation of sixty degrees clockwise from the directional element; a sixth reference element indicating an angular orientation of one-hundred twenty degrees clockwise from the directional element; a seventh reference element indicating an angular orientation of one-hundred fifty degrees clockwise from the directional element; an eighth reference element indicating an angular orientation of two-hundred ten degrees clockwise from the directional element; a ninth reference element indicating an angular orientation of two-hundred forty degrees clockwise from the directional element; a tenth reference element indicating an angular orientation of three-hundred degrees clockwise from the directional element; and an eleventh reference element indicating an angular orientation of three-hundred thirty degrees clockwise from the directional element.

In certain embodiments, the user-controlled indicator comprises numerals to indicate corresponding clock face positions with respect to the directional element. In particular embodiments, the plurality of reference elements are configured as straight lines. In some embodiments, the plurality of reference elements are configured as tapered lines, and in specific embodiments the plurality of reference elements are configured as angular points. In certain embodiments, the plurality of reference elements are configured as arrows.

In particular embodiments, the user-controlled indicator comprises a circle; the directional element is configured as an arrow extending from the circle; and the plurality of reference elements extend from the circle. In some embodiments, the plurality of reference elements are configured as lines extending in an outward direction from the circle, and in specific embodiments, the plurality of reference elements are configured as lines extending in an inward direction from the circle.

Any embodiment discussed with respect to one aspect of the invention applies to other aspects of the invention as well.

The embodiments in one section of this disclosure are understood to be embodiments of the invention that are applicable to all aspects of the invention, including those in other sections of the disclosure.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value.

Following long-standing patent law, the words "a" and "an," when used in conjunction with the word "comprising" in the claims or specification, denotes one or more, unless specifically noted.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The terms "substantially" and "generally" are defined as largely but not necessarily wholly what is specified (and includes what is specified; e.g., substantially 90 degrees includes 90 degrees and generally parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a device for multi-viewer display, or a component of such a device, that is configured in a certain way is configured in at least that way, but it can also be configured in other ways than those specifically described.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1:
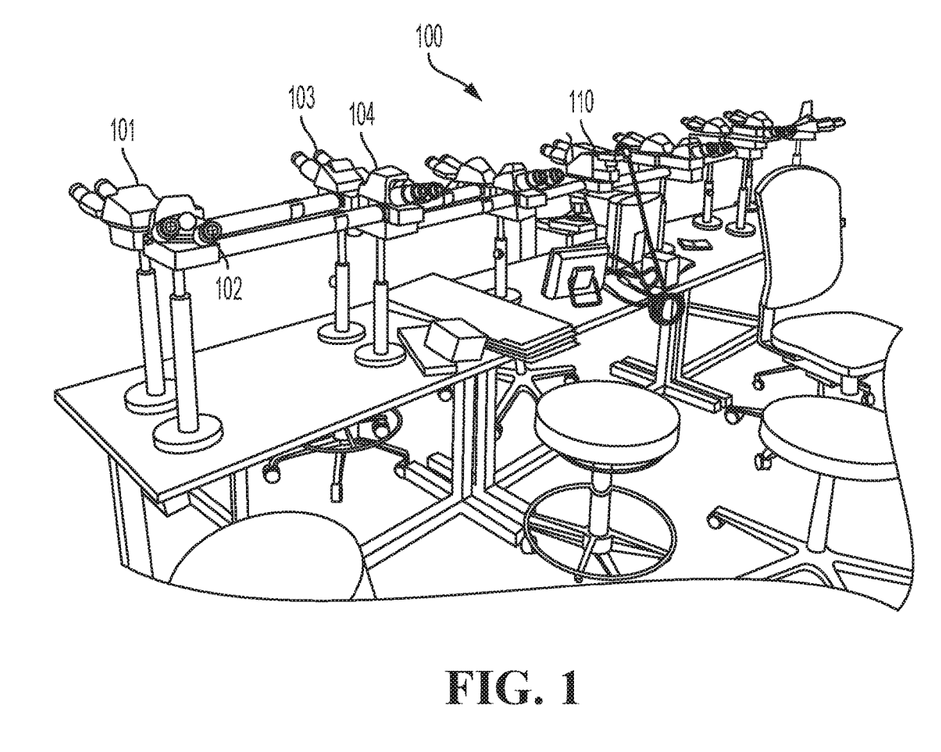
FIG. 1 shows a perspective view of a multi-viewer microscope according to exemplary embodiments of the present disclosure.
Figure 2:
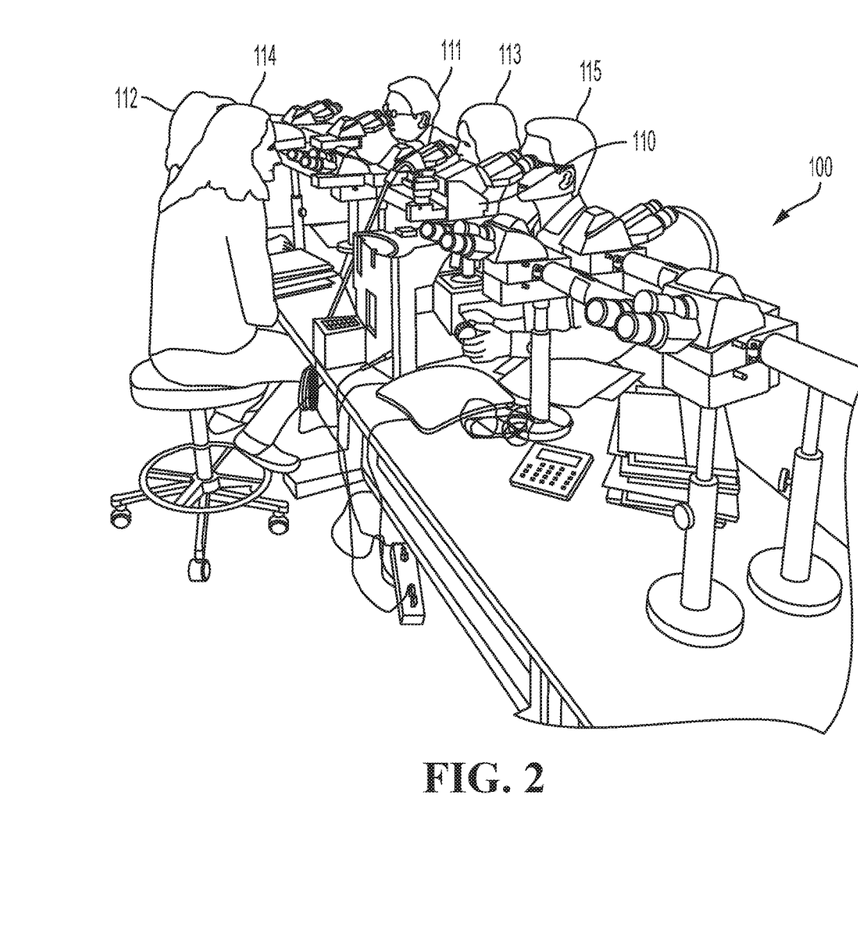
FIG. 2 shows a perspective view of the embodiment of FIG. 1 during use.
Figure 3:
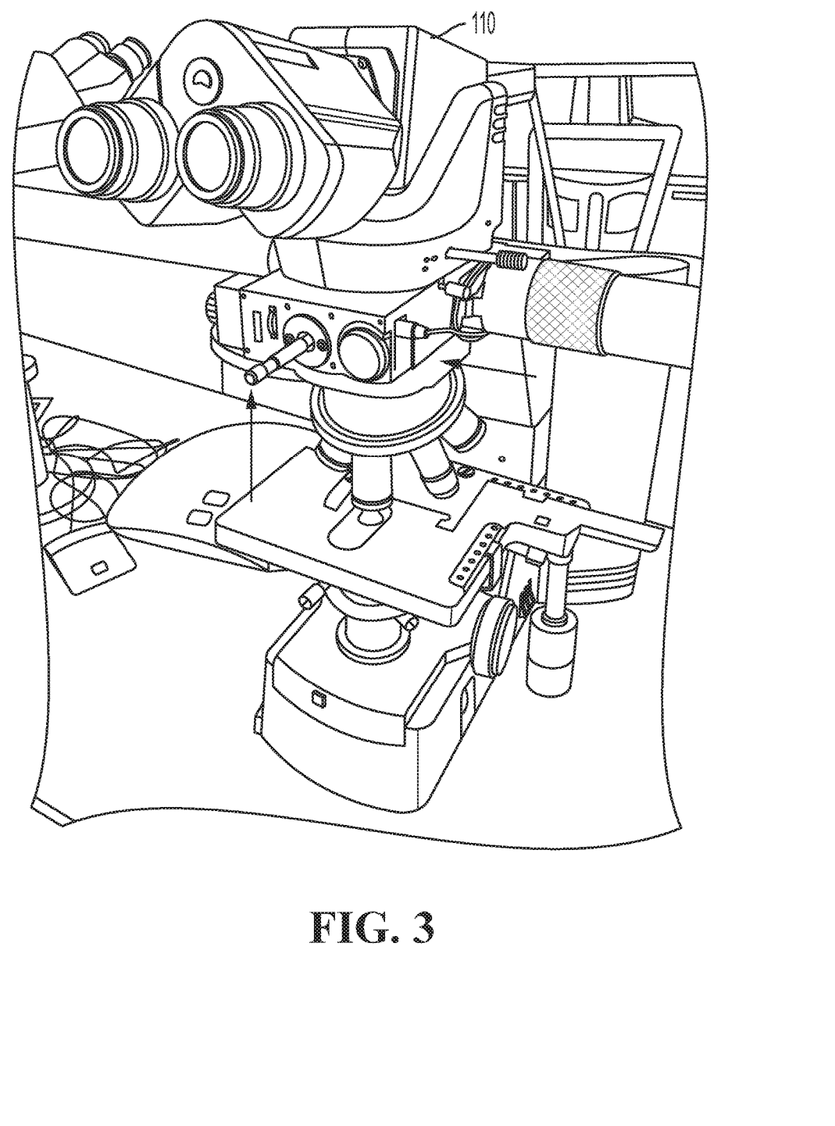
FIG. 3 shows a perspective view of a control module of the embodiment of FIG. 1.

Referring now to FIGS. 1-3, an exemplary embodiment of a multi-viewer microscope 100 is shown. In this embodiment, multi-viewer microscope 100 comprises a primary control module 110 (shown in more detail in FIG. 3) and a plurality of viewing stations (or "heads"). In the embodiment shown in FIGS. 1-3, multi-viewer microscope 100 comprises fourteen viewing stations, but it is understood that other embodiments may comprise a different number of viewing stations. During use, a number of viewers can each be positioned at a viewing station to view an image of a specimen under examination at primary control module 110. Such an arrangement allows each viewer to simultaneously view the same image. This can be particularly beneficial in teaching or instructional environments, including for example, conferences or classrooms. In particular embodiments, such microscopes can be utilized by pathologists for simultaneous visualization and consultation regarding tissue sections.

As shown in FIG. 1, viewing stations 101 and 103 are shown oriented 180 degrees from viewing stations 102 and 104. Accordingly, during use of multi-viewer microscope 100, viewers 111 and 113 are facing viewers 112 and 114 as shown in FIG. 2. Also shown in FIG. 2 is a user 115 at control module 110. In this example, viewers 111 and 113 are facing the same direction as user 115, while viewers 112 and 114 are facing the opposite direction of user 115. Such an arrangement of viewers can lead to confusion regarding the orientation of the display at each viewing station, as explained in further detail below.

Figure 4:
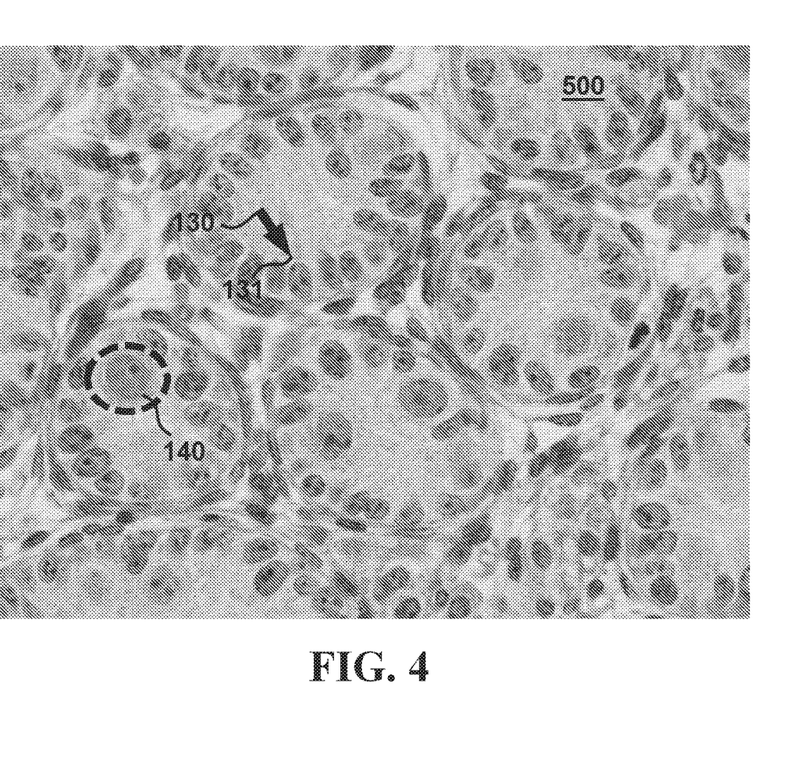
FIG. 4 shows a second image obtained with the embodiment of FIG. 1 with a typical indicator and an object of interest.

Referring now to FIG. 4, a typical image 500 that can be viewed at each viewing station is shown. In this image, a cursor or indicator 130 can be positioned or manipulated by a microscope user (e.g. user 115 at control module 110 shown in FIG. 2) to indicate particular regions or objects of interest. In the typical example shown in FIG. 4, indicator 130 comprises an element 131 (e.g. an arrow in the embodiment shown) to indicate a direction. In exemplary embodiments, indicator 130 can be positioned (e.g. translated laterally in the X-Y plane) in a desired location within the image. In certain embodiments, indicator 130 can also be manipulated (e.g. rotated) to orient element 131 in the desired direction.

In FIG. 4, indicator 130 has been positioned in a desired location and orientation such that element 131 is indicating a direction toward the lower right corner of an image 500. In the image shown in FIG. 4, an object of interest 140 is shown in a second location of the image that is spaced apart from indicator 130. It is understood that the dashed lines shown in the image surrounding object of interest 140 would not be visible to viewers of microscope 100 during use. The dashed lines shown in FIG. 4 are provided for purposes of discussion in this disclosure. During use, the spatial relationship between indicator 130 and object of interest 140 can create confusion among the viewers of microscope 100. For example, user 115 at control module 110 (shown in FIG. 2) can position indicator 130 as shown in FIG. 4. If user 115 then asks other viewers to refer to the object of interest 140 using typical directional expressions, it can create confusion as to the angular relationship between indicator 130 and object of interest 140. This can be particularly true if user 115 at control module 110 is facing a different direction than a particular viewer at a viewing station. For example, if user 115 at control module 110 refers to the area comprising object of interest 140 using typical direction expressions (e.g. left-right, up-down, etc.) there can be confusion as to which whether the direction indications are made in reference to the image being viewed or the orientation of the user. In addition, if user 115 at control module 110 refers to the area comprising object of interest 140 using a "clock-face" orientation (e.g. "seven o'clock"), there can be confusion as to the correct orientation and whether the center of the clock-face is at indicator 130 or object of interest 140.

Figure 5:
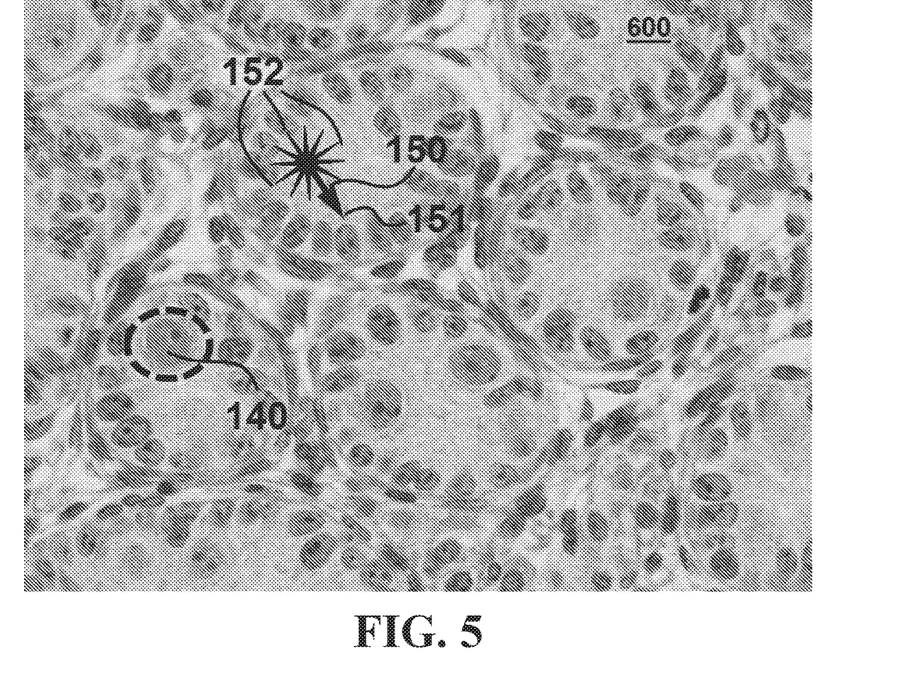
FIG. 5 shows a third image obtained with the embodiment of FIG. 1 with a typical indicator, an object of interest, and an indicator according to exemplary embodiments of the present disclosure.

Referring now to FIG. 5, an exemplary embodiment of an indicator 150 is shown with features configured to address the issues noted with typical indicators discussed above. In this embodiment, an image 600 includes an indicator 150 that comprises a directional element 151 indicating a primary direction and a plurality of additional reference elements 152 indicating an angular orientation of indicator 150 with respect to directional element 151. For purposes of clarity, not all of reference elements 152 are indicated with reference lines in FIG. 5 (e.g., reference elements 152 corresponding with three o'clock, six o'clock and nine o'clock orientation with respect to directional element 151 are indicated with reference lines).

During use, reference elements 152 can assist viewers in properly orienting objects within the image for discussion purposes. For example, if a user refers to an object of interest at "three o'clock" with respect to indicator 150, then other viewers will understand which direction is intended by the user. As understood in accepted nomenclature, the viewers will view the primary direction of directional element 151 (e.g. the direction of the arrow pointer in indicator 150) as the "twelve o'clock" position. As indicated in FIG. 5, the direction that is ninety degrees in a clockwise direction from the primary direction is understood to be the "three o'clock" position. Similarly, the direction that is one-hundred eighty degrees from the primary direction is understood to be the "six o'clock" position, and the direction that is two-hundred seventy degrees clockwise (or ninety degrees counter-clockwise) is understood to be the "nine o'clock" direction. Other reference elements 152 are shown to correspond with the one o'clock position (thirty degrees clockwise from the primary direction), the two o'clock position (sixty degrees clockwise from the primary direction), the four o'clock position (one-hundred twenty degrees clockwise from the primary direction), and the five o'clock position (one-hundred fifty degrees clockwise from the primary direction). Still other reference elements 152 are shown to correspond to the seven o'clock position (two-hundred ten degrees clockwise from the primary direction), the eight o'clock position (two-hundred forty degrees clockwise from the primary direction), the ten o'clock position (three-hundred degrees clockwise from the primary direction), the eleven o'clock position (three-hundred thirty degrees clockwise from the primary direction).

Accordingly, reference elements 152 will assist other viewers for the intended direction when a microscope user or other viewer refers to a location that is at one of the "clock-face" orientations. This can reduce confusion among the viewers and facilitate efficient analysis and discussion of the image being viewed by the multiple personnel.

Figure 6:
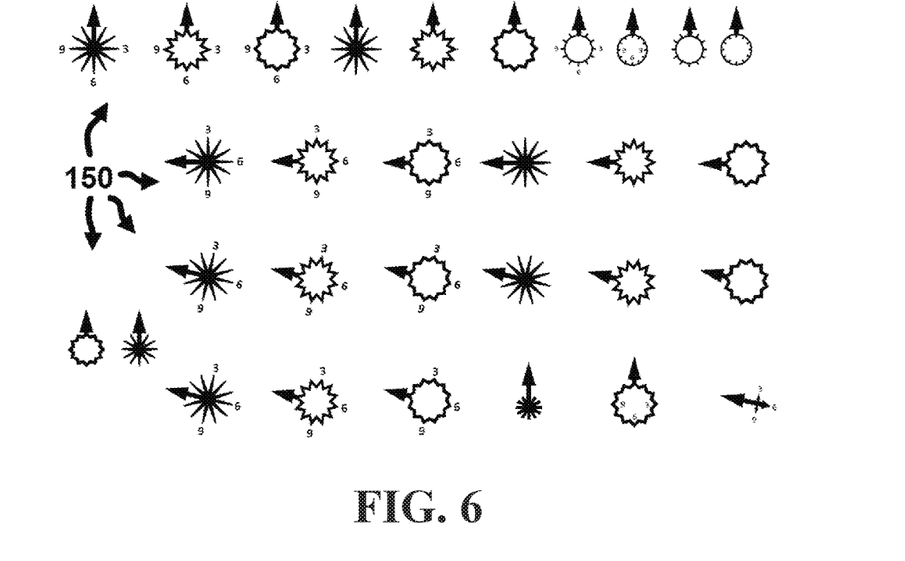
FIG. 6 show a plurality of different configurations of indicators according to exemplary embodiments of the present disclosure.

It is understood that indicator 150 shown in FIG. 5 is merely one embodiment of the present disclosure. Other embodiments may comprise indicators with a different configuration or features. Referring now to FIG. 6, for example, a plurality of different configurations for indicator 150 are shown. Similar to the embodiment shown in FIG. 5, each indicator includes a directional element (e.g. an arrow) indicating a primary direction, and a plurality of additional reference elements indicating an angular orientation with respect to the primary direction. Certain embodiments shown in FIG. 6 include numerals (e.g. "3", "6" and "9") to indicate corresponding clock face positions with respect to the directional element of the indicator. Also shown in the embodiments of FIG. 6, the reference elements may be configured as straight or tapered lines, angular points, or additional arrows. In particular embodiments, the reference elements may be configured as straight lines that extend from a circle in an outward or inward direction. The features shown in the exemplary embodiments of FIG. 6 can further facilitate understanding of the intended angular orientation with respect to the indicator being viewed in the image by the multiple viewers.

All patents, patent applications, and published references cited herein are hereby incorporated by reference in their entirety. While the devices and methods of the present disclosure have been described in connection with the specific embodiments thereof, it will be understood that they are capable of further modification. Furthermore, this application is intended to cover any variations, uses, or adaptations of the devices and methods of the present disclosure, including such departures from the present disclosure as come within known or customary practice in the art to which the devices and methods of the present disclosure pertain.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms about, substantially, generally, and approximately (and variations thereof) as used herein, are defined as at least approaching a given state. In specific embodiments, the terms may be defined as being largely but not necessarily wholly what is specified as understood by one of ordinary skill in the art, and in one non-limiting embodiment refers to ranges within 10%, preferably within 5%, more preferably within 1%, and most preferably within 0.5% of what is specified.

Furthermore, all the disclosed elements and features of each disclosed embodiment can be combined with, or substituted for, the disclosed elements and features of every other disclosed embodiment except where such elements or features are mutually exclusive.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

The following references are incorporated herein by reference:
U.S. Pat. No. 4,672,559
U.S. Pat. No. 5,586,243
U.S. Pat. No. 6,549,222
U.S. Patent Publication 2001050999
U.S. Patent Publication 2002149628
U.S. Patent Publication 2004227954
U.S. Patent Publication 2006122516
U.S. Patent Publication 2007239005
U.S. Patent Publication 2011164314
U.S. Patent Publication 2012068928

The invention claimed is:

1. A system for indicating a location on an image in a multi-viewer display, the system comprising:
   a plurality of viewing locations configured to view the image, wherein:
      the image comprises a user-controlled indicator;
      the user-controlled indicator includes a directional element indicating a primary direction of the user-controlled indicator; and
      the user-controlled indicator includes a plurality of reference elements, wherein each of the reference elements indicates an angular orientation with respect to the directional element of the user-controlled indicator.

2. The system of claim 1 wherein the multi-viewer display is a multi-viewer microscope.

3. The system of claim 2 wherein an X-Y position of the user-controlled indicator in the image is controlled by a user at a central control module.

4. The system of claim 3 wherein an angular orientation of the user-controlled indicator in the image is controlled by the user at the central control module.

5. The system of claim 2 wherein the multi-viewer microscope comprises a first viewing station oriented 180 degrees from a second viewing station.

6. The system of claim 1 wherein the directional element is configured as an arrow.

7. The system of claim 1 wherein the plurality of reference elements comprises:
   a first reference element indicating an angular orientation of ninety degrees clockwise from the directional element;
   a second reference element indicating an angular orientation of one-hundred eighty degrees clockwise from the directional element; and
   a third reference element indicating an angular orientation of two-hundred seventy degrees clockwise from the directional element.

8. The system of claim 7 wherein the plurality of reference elements further comprises:
   a fourth reference element indicating an angular orientation of thirty degrees clockwise from the directional element;
   a fifth reference element indicating an angular orientation of sixty degrees clockwise from the directional element;
   a sixth reference element indicating an angular orientation of one-hundred twenty degrees clockwise from the directional element;
   a seventh reference element indicating an angular orientation of one-hundred fifty degrees clockwise from the directional element;
   an eighth reference element indicating an angular orientation of two-hundred ten degrees clockwise from the directional element;
   a ninth reference element indicating an angular orientation of two-hundred forty degrees clockwise from the directional element;
   a tenth reference element indicating an angular orientation of three-hundred degrees clockwise from the directional element; and an eleventh reference element indicating an angular orientation of three-hundred thirty degrees clockwise from the directional element.

9. The system of claim 1 wherein the user-controlled indicator comprises numerals to indicate corresponding clock face positions with respect to the directional element.

10. The system of claim 1 wherein:
the user-controlled indicator comprises a circle;
the directional element is configured as an arrow extending from the circle; and
the plurality of reference elements extend from the circle.

11. A method of indicating a location on an image in a multi-viewer display comprising a plurality of viewing locations, the method comprising:
positioning a user-controlled indicator in a first location of the image, wherein the user-controlled indicator includes a directional element indicating a primary direction of the user-controlled indicator; and
the user-controlled indicator includes a plurality of reference elements, wherein each of the reference elements indicates an angular orientation with respect to the directional element of the user-controlled indicator.

12. The method of claim 11 further comprising indicating a second position of the image, wherein:
the second position of the image is located at a first angular orientation from the first position; and
the first angular orientation corresponds with a first reference element of the user-controlled indicator.

13. The method of claim 12 wherein the multi-viewer display is a multi-viewer microscope.

14. The method of claim 13 wherein an X-Y position of the user-controlled indicator in the image is controlled by a user at a central control module.

15. The method of claim 14 wherein an angular orientation of the user-controlled indicator in the image is controlled by the user at the central control module.

16. The method of claim 13 wherein the multi-viewer microscope comprises a first viewing station oriented 180 degrees from a second viewing station.

17. The method of claim 12 wherein the directional element is configured as an arrow.

18. The method of claim 12 wherein the plurality of reference elements comprises:

a first reference element indicating an angular orientation of ninety degrees clockwise from the directional element;
a second reference element indicating an angular orientation of one-hundred eighty degrees clockwise from the directional element; and
a third reference element indicating an angular orientation of two-hundred seventy degrees clockwise from the directional element.

19. The method of claim 18 wherein the plurality of reference elements further comprises:
a fourth reference element indicating an angular orientation of thirty degrees clockwise from the directional element;
a fifth reference element indicating an angular orientation of sixty degrees clockwise from the directional element;
a sixth reference element indicating an angular orientation of one-hundred twenty degrees clockwise from the directional element;
a seventh reference element indicating an angular orientation of one-hundred fifty degrees clockwise from the directional element;
an eighth reference element indicating an angular orientation of two-hundred ten degrees clockwise from the directional element;
a ninth reference element indicating an angular orientation of two-hundred forty degrees clockwise from the directional element;
a tenth reference element indicating an angular orientation of three-hundred degrees clockwise from the directional element; and
an eleventh reference element indicating an angular orientation of three-hundred thirty degrees clockwise from the directional element.

20. The method of claim 12 wherein:
the user-controlled indicator comprises a circle;
the directional element is configured as an arrow extending from the circle; and
the plurality of reference elements extend from the circle.

* * * * *